Aug. 6, 1963
N. CORDIS
3,100,043
VARIABLE-DELIVERY BLADE-TYPE CONVEYOR
Filed April 6, 1960
4 Sheets-Sheet 1
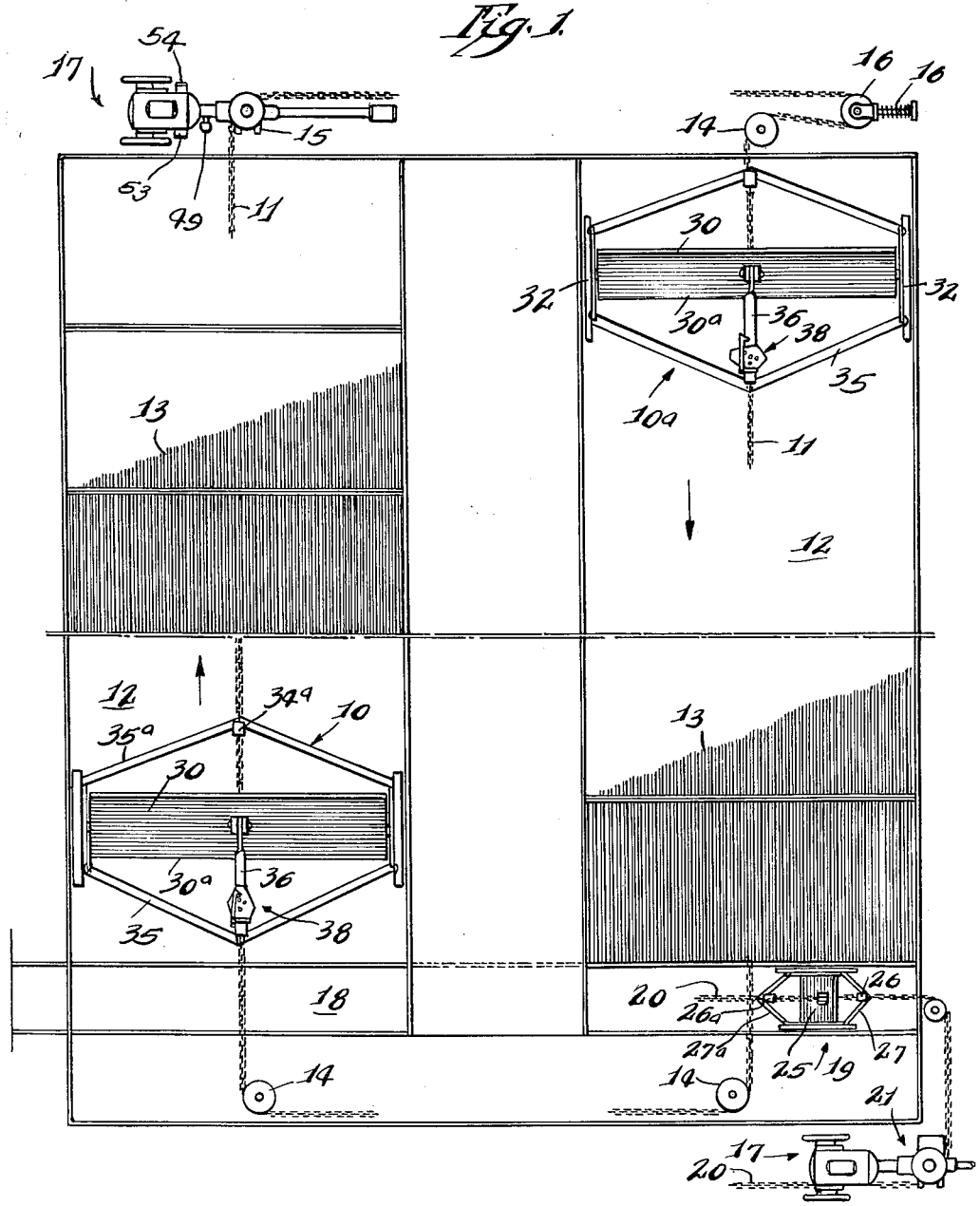
Inventor.
Nat Cordis.
By- Everett A. Johnson
Attorney.

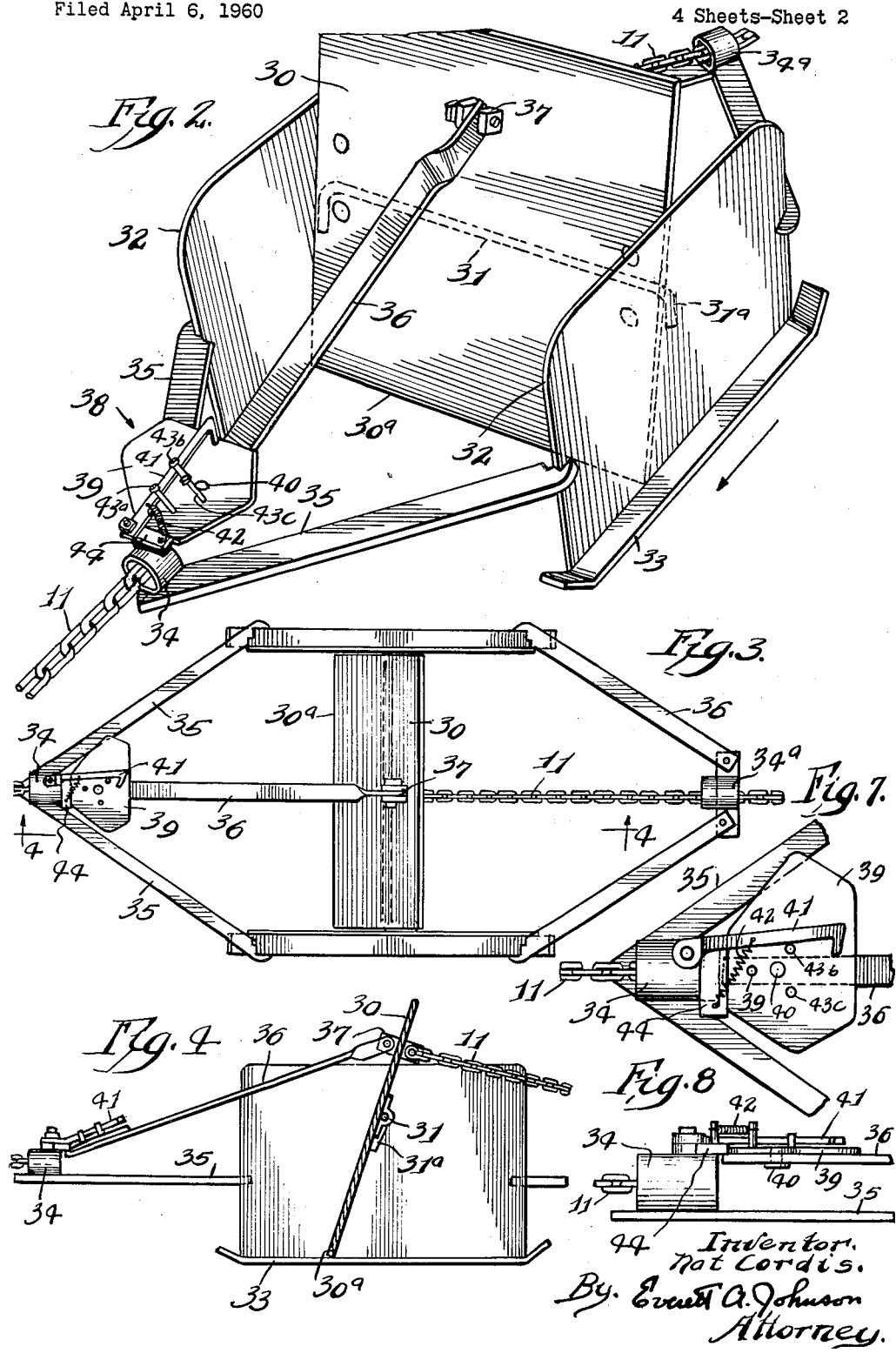

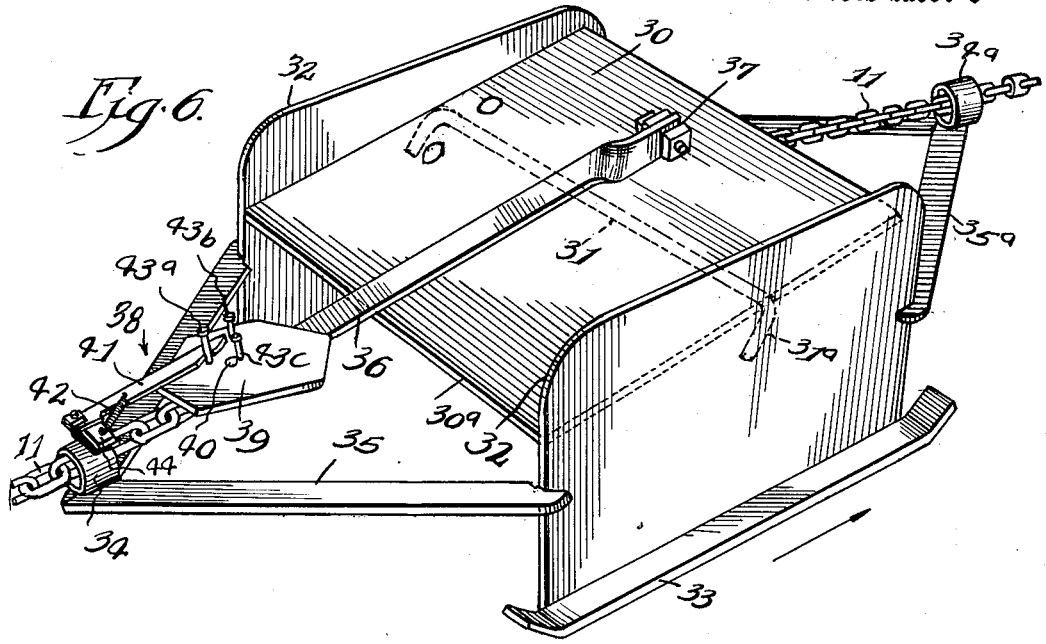
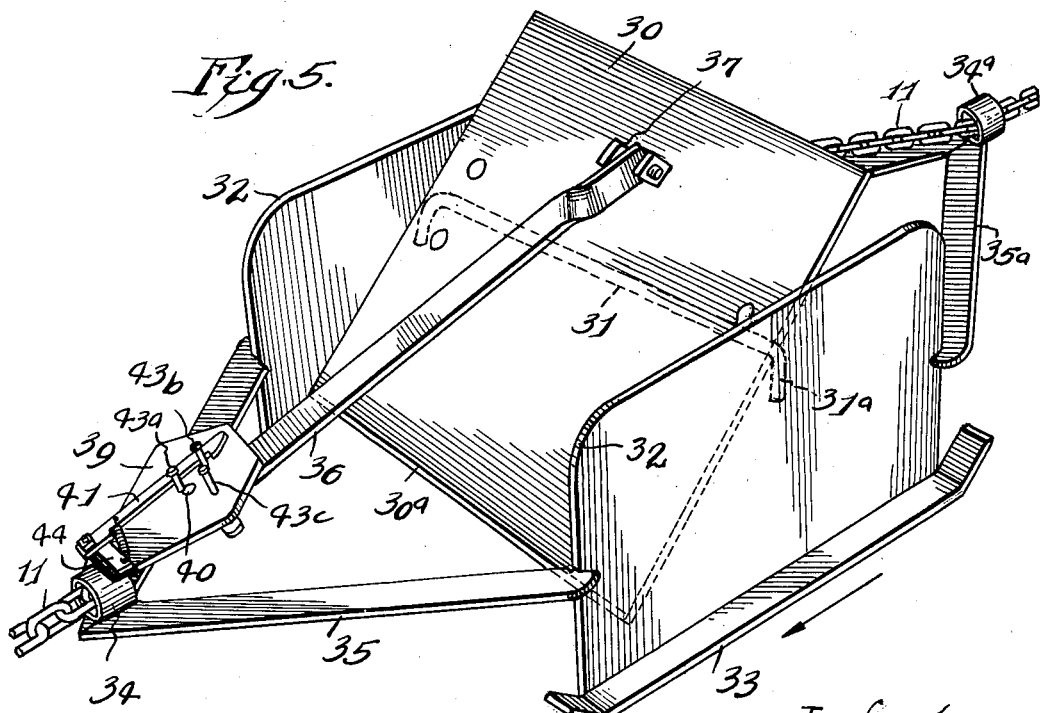

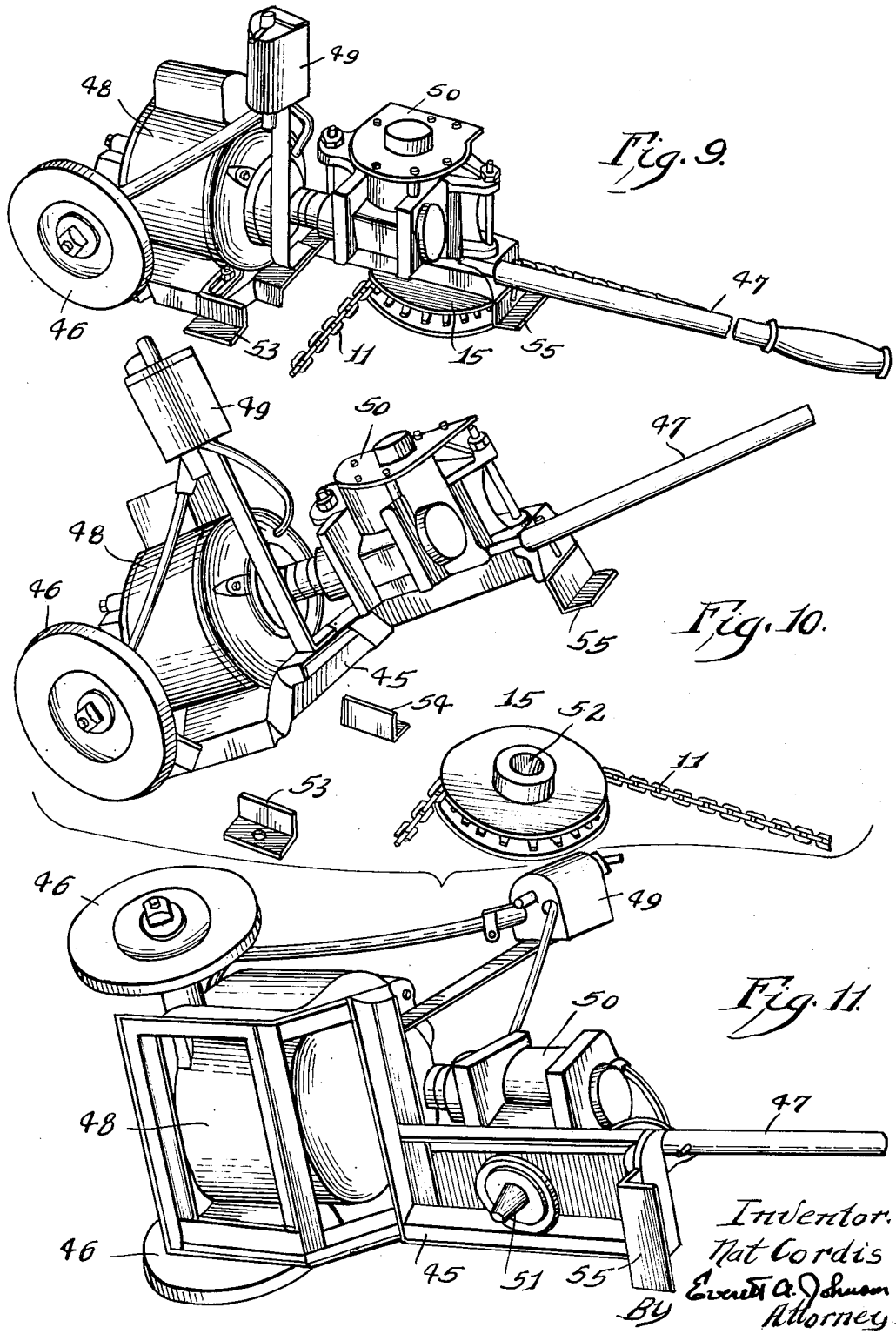

United States Patent Office 3,100,043
Patented Aug. 6, 1963

3,100,043
VARIABLE-DELIVERY BLADE-TYPE CONVEYOR
Nat Cordis, Crown Farms, Silver Lake, Wis.
Filed Apr. 6, 1960, Ser. No. 20,325
10 Claims. (Cl. 198—224)

This invention relates to floor cleaning equipment such as is used in removing litter from barns and poultry houses.

In such barns and houses the frequency of cleaning varies and depth of litter likewise varies. Heretofore, a scraper designed for one schedule may not be suitable for removing litter permitted to accumulate to a greater depth. Furthermore, the length of the path over which the scraper may be effective was limited. Accordingly, it is a primary object of this invention to provide a system which is adaptable for use on shallow or deep litter and on long or short runs.

In various automated systems in animal husbandry separate drive means have been required. Thus on several adjacent cleaners, each has been provided with its own motor and transmission. Also, where a cleaner and a feeder are both installed in a building separate drive means have been provided, even though the drives are used at different times.

It is therefore a further object of this invention to provide a drive means which is interchangeable between similar or dissimilar units such as cleaners and feeders. Another object of the invention is to provide a drive means which is portable and adaptable for use on more than one conveyor system.

Briefly, according to my invention, I attain the aforementioned and additional objects by providing a scraper unit having an automatically and operationally adjustable blade. The conveyor includes scraper blade means hingedly supported within a slidable frame means. A flexible tow means is fixed to the scraper blade and is coupled to the blade by a rigid arm having selective cam means for varying the effective length of the hinged arm and thereby positioning the blade to vary the bite which the blade takes and so as to place the variable blade in a wholly-inoperative position during the rearward towing of the scraper-conveyor apparatus.

The complete installation includes a pair of scraper units on separate flights of tow conveyor and operating oppositely over separate channels below a slat floor, the channels discharging into a cross gutter or pit. The tow cable or chain is trained about four corners, comprising pulleys or sprockets, and one of the corners is adapted to receive a portable drive means.

The portable drive comprises a motor and a transmission fixed to a wheeled carrier, with the output shaft or coupling directed downwardly to mate with a coupling or shaft on a drive sprocket or pulley when the carrier is lowered thereover.

Further details of the invention will be described by reference to the accompanying drawings wherein:

FIGURE 1 is a schematic plan view of an installation embodying my invention;

FIGURES 2, 3 and 4 are perspective, top, and side views, respectively of a scraper unit with its blade in the lower most position;

FIGURE 5 is a perspective view showing the blade in an intermediate position;

FIGURE 6 is a perspective view showing the blade in its upper most position while being towed rearwardly;

FIGURES 7 and 8 are top and side views respectively of the cam assembly corresponding to the positions shown in FIGURES 2 and 3;

FIGURE 9 shows details of the drive means in its operative position of FIGURE 1;

FIGURE 10 shows the drive of FIGURE 9 in a raised portable position; and

FIGURE 11 is a view from beneath the drive of FIGURES 9 and 10.

Referring to the drawings, a pair of scraper-conveyor units 10 and 10a are towed by chain 11 over the floor 12 below the slats 13 through which the litter falls. The chain 11 is trained about corner pulleys 14, drive sprocket 15, and take-up pulley 16. The portable drive 17 reversibly drives the sprocket 15 to alternately move the scraper units 10 and 10a forwardly and rearwardly simultaneously as shown in FIGURE 1.

The scraper unit 10 or 10a discharges litter into pit 18 in which conveyor 19, which may be generally similar to 10 and 10a, is operated by auxiliary tow chain 20 and driven by portable drive 17 and the drive sprocket 21.

In the embodiment shown, the cross gutter conveyor 19 has the tow chain 20 linked directly to the blade 25, the chain passing through chain guides 26 and 26a in outrigger yokes 27 and 27a carried by the frame 28.

The scraper units 10 and 10a are similar to the construction of FIGURES 2 to 6, but the blades 30 are relatively broader in FIGURE 1. Thus, in a typical installation the blades 30 may be 6 to 10 feet long and the blade 25 of the cross gutter conveyor 19 may be about 15 to 30 inches long. The pit 18 may be of corresponding depth.

Referring to FIGURES 2–6, the blade 30 is carried by axle 31 fixed to opposite side plates 32 provided with skids 33. The tow chain 11 passes through chain guides 34 and 34a on yokes 35 and 35a fixed at their ends to the side plates 32.

One end of the positioning arm 36 is attached by hinge 37 to the blade 30 above the axle 31 and the other end carries the cam means 38. The cam 39 having lobes 39a, 39b and 39c is pivoted by pin 40. The hook 41 is pivotally fixed at one end to the chain guide 34 and is biased by coil spring 42 having one end fixed to the hook 41 and the other end anchored on the cam stop 44.

Referring to FIGURES 3, 7 and 8, the cam pins 43a, 43b and 43c carried by cam 39 are successively grasped by the spring-biased hook 41 on each reversal of the direction of pull on the tow chain 11 as the cam 39 is pulled away from cam stop 44 the hook 41 rotates the cam to position a new lobe 39a, or 39b, or 39c against the stop 44. Since the cam lobes are different distances from the pin 40, the effective length of the positioning arm 36 is changed and when towed forwardly the blade 30 will assume the corresponding tilted position with the working edge 30a in the various positions shown in FIGURES 2 to 6.

Thus in operation the first pull on the tow chain 11 sets the blade 30 in its intermediate position of FIGURE 5. When towed in this position the blade 30 removes litter to a limited depth. Releasing the tension on tow 11 rests the cam 39 and again pulling on tow 11 sets the blade 30 as shown in FIGURES 2, 3 and 4. In this position, the blade 30 is removing litter from the floor 12 to a minimum depth although the ends 31a of the axle 31 limit the downward tilt of the blade 30.

The portable drive 17 of FIGURES 9, 10 and 11 (and FIGURE 1) includes the wheeled carrier 45, wheels 46, handle 47, electric motor 48, reversing control switch 49 and transmission or speed reducer 50. The power take-off or drive may comprise a splined shaft and socket or a cone clutch 51 as shown adapted to engage the female portion 52 in the drive sprocket which is in driving engagement with the tow 11.

Guides 53 and 54 in the floor position the carrier 45 with respect to the drive sprocket and foot 55 supports the carrier and the clutch in the operative position. Ordinarily the weight of the portable drive 17 is sufficient to keep it in engagement. However positive, though releasable, means may be provided (but not shown) on the foot 55 or otherwise to hold down the drive 17.

The foregoing description has been with respect to a closed circuit system wherein three idler corners are associated with a single drive corner. It is contemplated, however, that the principles of design incorporated herein may be utilized in a circuit which includes only a drive end and a turnaround end as shown with respect to the cross gutter in FIGURE 1.

Although my apparatus has been described in terms of particular embodiments thereof which have been set forth in considerable detail, it should be understood that this is by way of illustration only and that my invention is not limited thereto. Alternative constructions and operating techniques will become apparent to those skilled in the art in view of my disclosure and, accordingly, it is contemplated that modifications can be made without departing from the spirit of the described invention.

What I claim is:

1. In a scraper conveyor apparatus for use in animal husbandry, which includes scraper blade means hingedly supported within a slidable frame means and a flexible towing means for towing said scraper-conveyor, the improvement which comprises blade-positioning linkage means interposed said flexible towing means and said scraper blade means, said linkage having a successively variable effective length to selectively and step-wise position the said blade relative to said frame means so as to vary the bite which said blade takes in its forward towing and so as to place said blade in a wholly-inoperative position for the rearward towing of said scraper-conveyor apparatus, said blade-positioning linkage comprising a bar hinged at one end to the said blade means, and a progressively rotatable cam pivoted at the other end of said bar and providing a variable extension thereof, said cam taking the thrust of said bar when the blade is towed forwardly.

2. The apparatus of claim 1 wherein blade-positioning linkage means comprises a rigid bar means interposed one end of said flexible towing means and said scraper blade means, said bar means being hinged to said scraper blade means, and cam means rotatably mounted on said bar means, said cam means acting through said bar means and the forward yoke means so as to establish predetermined inclined position of the scraper blade means.

3. The apparatus of claim 2 which includes a frame having opposed rearward and forward yokes with guide means therein through which the flexible towing means is threaded for attachment to an upper portion of the scraper blade means.

4. A scraper conveyor apparatus for use in animal husbandry including a suspended scraper blade means hingedly supported within a slidable frame means having side plates, said frame and said blade forming a scraper-conveyor, and a flexible conveyor means for towing said scraper-tow adjustable cam, means providing a variable linkage between said flexible tow means and said scraper blade means for selectively and successively positioning the lower working edge of said blade said cam means including a blade-positioning bar, the effective length of said bar being determined by the position of said cam means.

5. The apparatus of claim 4 which includes a frame having rearward and forward yoke means through which a flexible tow line is threaded to actuate said cam for positioning the scraper blade means.

6. The apparatus of claim 5 which includes a rigid bar means interposed one end of said flexible tow line and said scraper blade means, said bar means being hinged to said scraper blade means, and said cam means is rotatably mounted on said bar means and is positioned by spring-biased means as the tow means having terminal ends affixed to said bar and to said blade in the scraper-conveyor are shifted rearward or forward of said blade so as to determine the inclined position of the scraper blade means.

7. A scraper-conveyor apparatus for use in animal husbandry which comprises a scraper blade means inclined to the surface over which it passes, axle means swingably suspending said blade means, frame means supporting said axle means and adapted to be drawn over the surface, said frame means including a pair of side plate members and a pair of opposed forward and rearward yokes fixed to said side members on opposite sides of said axle, flexible tow means hitched to said blade means above said axle means, tow guide means on each of said opposed yokes through which said flexible tow means is threaded, bar means hinged at one end to said blade means and linked at the other end to said flexible tow means, and an adjustable multi-position cam linkage carried by said bar having reset means fixed to the forward yoke, whereby said blade may be disposed in each of three positions successively in response to the movement of said flexible tow means through said guide means.

8. The apparatus of claim 7 including a portable drive for said flexible tow means which includes a wheeled carrier, an electric motor, a transmission, said transmission having a power take-off extending downwardly of the carrier when it is in a lowered and immobile position, a drive pulley for said flexible conveyor, and clutch means on said pulley engaging said power take-off.

9. The apparatus of claim 8 which includes a motor reversing switch.

10. The apparatus of claim 8 wherein said wheeled carrier includes a pair of wheels, a carrier frame, a foot on said frame, and an elongated handle whereby the carrier can be tilted upwardly and wheeled about.

References Cited in the file of this patent

UNITED STATES PATENTS

| | | |
|---|---|---|
| 2,303,649 | Livingston | Dec. 1, 1942 |
| 2,552,743 | Simpson | May 15, 1951 |
| 2,639,803 | Tonagel et al. | May 26, 1953 |
| 2,888,087 | Duncan | May 26, 1959 |
| 2,926,736 | Lee | Mar. 1, 1960 |